United States Patent
Östergaard et al.

(10) Patent No.: US 8,543,054 B2
(45) Date of Patent: Sep. 24, 2013

(54) METHOD AND APPARATUS FOR UPLINK SCHEDULING USING RELAYS

(75) Inventors: Jessica Östergaard, Stockholm (SE); Riikka Susitaival, Helsinki (FI)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 503 days.

(21) Appl. No.: 12/980,191

(22) Filed: Dec. 28, 2010

(65) Prior Publication Data

US 2011/0269393 A1    Nov. 3, 2011

Related U.S. Application Data (60) Provisional application No. 61/330,750, filed on May 3, 2010.

(51) Int. Cl.
*H04B 3/36* (2006.01)

(52) U.S. Cl.
USPC ............ 455/7; 455/11.1; 455/15; 455/18; 455/509; 455/500; 370/315

(58) Field of Classification Search
USPC .......... 455/7, 11.1, 15, 18, 422.1, 403, 426.1, 455/426.2, 509, 500, 517, 445, 412.1, 412.2, 455/550.1, 514, 515, 508, 450; 370/315
See application file for complete search history.

(56) References Cited

U.S. PATENT DOCUMENTS

| | | |
|---|---|---|
| 2008/0207214 A1 | 8/2008 | Han et al. |
| 2009/0196177 A1 | 8/2009 | Teyeb et al. |
| 2010/0070814 A1 | 3/2010 | Damnjanovic et al. |
| 2010/0150173 A1 | 6/2010 | Yu et al. |
| 2011/0080865 A1* | 4/2011 | Tsai et al. ................ 370/315 |
| 2012/0236782 A1* | 9/2012 | Bucknell et al. ............ 370/315 |

FOREIGN PATENT DOCUMENTS

| | | |
|---|---|---|
| WO | 2009095814 A1 | 8/2009 |
| WO | 2010/057521 A1 | 5/2010 |

OTHER PUBLICATIONS

ETRI, "Consideration on MAC procedures for Un interface", 3GPP TSG RAN WG2 #68, Nov. 9, 2009, Jeju, Korea, R2-096497.

(Continued)

*Primary Examiner* — Keith Ferguson
(74) *Attorney, Agent, or Firm* — Coats & Bennett, P.L.L.C.

(57) ABSTRACT

In one or more embodiments, the present invention provides a method and apparatus for "early" triggering of a BSR in a relay node. Doing so is advantageous, for example, in reducing the overall time between a UE's transmission of data to a relay node on an access link and the corresponding transmission of that data from the relay node to a donor base station on a backhaul link. Of course, that example is non-limiting. More broadly, in at least one embodiment, the present invention provides for triggering a BSR in the relay node right after learning that there is at least one UE connected to the relay node that wants to transmit UL data. Further, one or more embodiments provide a simple method and apparatus for using a relay node BSR to inform a donor base station about the scheduled status of UEs supported by the relay node.

22 Claims, 7 Drawing Sheets

(56) References Cited

OTHER PUBLICATIONS

ETRI, "Discussions on buffer Status Report over Un interface", 3GPP TSG RAN WG2 #69bis, Apr. 12-16, 2010, Beijing, China, R2-102252.

3rd Generation Partnership Project. 3GPP TS 36.201, V8.0.0 (Sep. 2007). 3rd Generation Partnership Project; Technical Specification Group Radio Access Network; Evolved Universal Terrestrial Radio Access (E-UTRA); Long Term Evolution (LTE) physical layer; General description (Release 8). Sep. 2007.

3rd Generation Partnership Project. 3GPP TS 36.321, V9.2.0 (Mar. 2010). 3rd Generation Partnership Project; Technical Specification Group Radio Access Network; Evolved Universal Terrestrial Radio Access (E-UTRA); Medium Access Control (MAC) protocol specification (Release 9). Mar. 2010.

\* cited by examiner

METHOD AND APPARATUS FOR UPLINK SCHEDULING USING RELAYS

RELATED APPLICATIONS

This application claims priority under 35 U.S.C. §119 from the U.S. provisional patent application filed on 3 May 2010 and assigned App. No. 61/330,750.

TECHNICAL FIELD

The present invention generally relates to relays in wireless communication networks and particularly relates to scheduling on relay-based radio links.

BACKGROUND

Relays increasingly play a role in increasing range and/or signal quality in wireless communication systems. For example, Release 10 of the Long Term Evolution (LTE) standards includes support for the use of relays to improve cell-edge coverage and capacity in a cost-effective manner.

In an example relaying scenario for the LTE case, a donor base station in the LTE network—referred to as a donor eNodeB (DeNB)—connects to a relay node that in turn connects to user equipments (UEs). The DeNB transmits downlink data to the relay using an LTE access link and in turn the relay forwards the data to targeted UEs that are supported by the relay. Correspondingly, when one of the UEs has uplink (UL) data available, it transmits that data to the relay node and the relay node transmits it to the DeNB. The LTE standard refers to the link between the DeNB and the relay node as the Un or backhaul link and refers to the link between the relay node and the UEs as the Uu or access link.

The backhaul link between the DeNB and the relay node is similar to the traditional link between the eNB and UE. The link implements normal LTE L2 protocols such as PDCP (Packet Data Convergence Protocol), RLC (Radio Link Control), HARQ (Hybrid Automatic Repeat reQuest), and RRC (Radio Resource Control). Thus, the behavior of the relay node towards the DeNB in this link is similar to the behavior of a UE. Scheduling of radio resources on the backhaul link is controlled by the donor eNB. Thus, uplink scheduling in the backhaul link reuses the scheduling mechanisms standardized for UEs.

To understand these scheduling mechanisms, first consider the nominal UE-to-eNB scheduling case. According to the standard UL scheduling procedure defined for LTE Rel-8/Rel-9 (see 3GPP TS 36.201), a UE triggers a Buffer Status Report (BSR) when new data arrives in its empty transmit UL buffer, or when the newly arrived data belongs to a higher priority logical channel group than any existing data in its UL transmit buffer. If the UE does not have UL resources to transmit the BSR, it triggers a Scheduling Request (SR) to the eNB.

The eNB schedules the UE responsive to receiving the SR and the UE uses the initial grant to transmit the BSR and potentially also other data up to the size of the grant. The BSR indicates to the eNB how much remaining UL data the UE has to transmit and the eNB uses that information as an input to its UL scheduler. For example, the UL scheduler in the eNB uses the information to determine the size and number of further grants to schedule, for transmission by the UE of its remaining UL data.

For many applications, short access delays play a crucial role in providing good end user performance. As one example, International Mobile Telecommunications Advanced (IMT Advanced) latency requirements state that the one way radio access delay between the mobile terminal and the base station should be under 10 ms. Latency concerns arise if the standard UL scheduling procedure is applied to the relay-node-to-DeNB link as well as to the UE-to-relay-node link—i.e., on both the Uu and Un interfaces.

Figure 1:
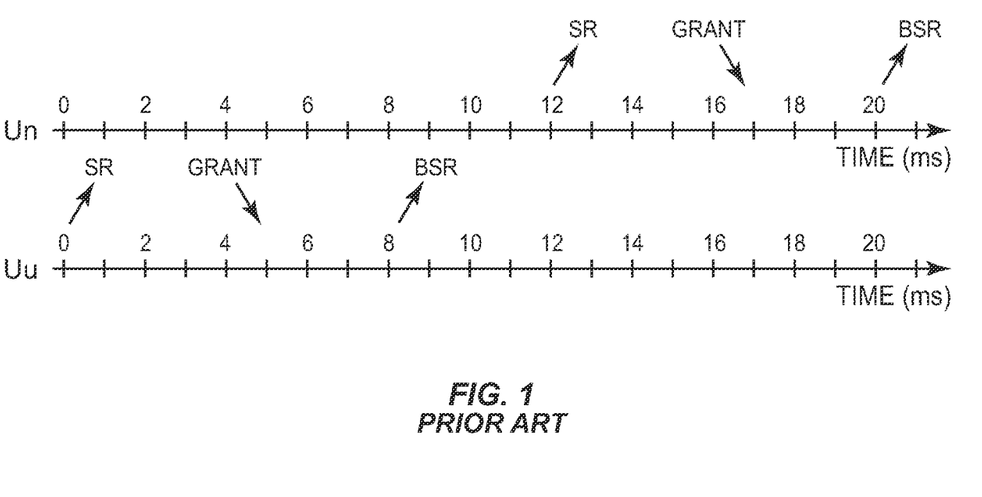
FIG. 1 is a timing diagram of Uu and Un scheduling requests and scheduling grants, according to a known buffer status reporting procedure.

See FIG. 1 for an illustration of the above "standard" case in the context of Uu and Un links. In the figure, data arrives in the UL buffer of a UE connected to a relay node and in response the UE transmits an SR to the relay node. With some processing delay, the relay node schedules the UE with a small initial grant. With the received grant, the UE transmits a BSR on the Uu link to the relay node, potentially with some UL data. The UE's UL data received by the relay node represents UL data to be sent from the relay node to the DeNB on the Un link.

Thus, in response to receiving any UE UL data, the relay node transmits an SR on the Un link to the DeNB. After some processing delay at the DeNB, the relay node receives a return grant from the DeNB, and the relay node sends another BSR to the DeNB using the granted resources. The relay node BSR includes information regarding UL data buffered in the relay, including data received from the UE.

From this simple illustration, one sees that the user plane delay over the Uu and Un links is potentially significant—e.g., about 20 ms from transmission of the SR from the UE to transmission of the BSR from the relay node. This size delay may be too much for certain applications. In an attempt to at least partially address the delay problem, contribution "R2-102252" was presented in RAN #69bis.

The '252 contribution proposed certain mechanisms to reduce latency in the user plane, for relay-supported links. For example, it proposed that a relay node triggers a BSR procedure right after receiving a BSR from UE, where the relay node BSR includes the UE BSR. While this mechanism offers delay reduction in certain scenarios, it does not adequately address initial delays in cases where small amounts of data are transmitted, nor does it necessarily provide the DeNB with timely information when data is available in the UL buffer at the relay node.

SUMMARY

In one or more embodiments, the present invention provides a method and apparatus for "early" triggering of a buffer status report (BSR) in a relay node. Doing so is advantageous, for example, in reducing the overall time between a UE's transmission of uplink data to a relay node on an access link and the corresponding transmission of that data from the relay node to a donor base station on a backhaul link. Of course, that example is non-limiting. In at least one embodiment, the teachings herein provide for triggering a BSR in the relay node right after learning that there is at least one UE connected to the relay node that wants to transmit UL data. In addition, in one or more embodiments taught herein, a relay node is configured to use an early relay node BSR to inform the donor base station about the scheduled status of UEs supported by the relay node.

Thus, in at least one embodiment, the teachings presented herein provide a method of uplink scheduling at a relay node that communicatively couples a user equipment (UE) to a supporting donor base station. Within the context of the method, the relay node and the UE communicate over an access link, (e.g., a Uu link) and the relay node and the donor base station communicate over a backhaul link (e.g., a Un link). Correspondingly, the method, which is carried out at the relay node, includes receiving an access link scheduling request from a UE having uplink data to send. The access link scheduling request requests that the relay node make at least an initial grant on the access link, so that the UE can make a scheduled uplink transmission to the relay node.

That scheduled uplink transmission comprises the uplink data that prompted the UE to send the access link scheduling request, if the initial grant by the relay node is large enough to accommodate all of the uplink data buffered at the UE. Alternatively, if the initial grant is not large enough, the UE's initial transmission will include a UE BSR and whatever amount of the buffered uplink data will fit into the initial grant, beyond the resources needed to convey the UE BSR. With this in mind, the method further includes triggering an early BSR at the relay node toward the donor base station. Here, the BSR triggering at the relay node can be understood as "early" in the sense that the relay node does not wait for receipt of any UL data from the UE before triggering its own BSR toward the donor base station The method further includes sending a backhaul link scheduling request to the donor base station responsive to said triggering of the early relay node BSR and correspondingly receiving a backhaul link scheduling grant from the donor base station. Still further, the method includes sending the early relay node BSR to the donor base station responsive to said backhaul link scheduling grant. In at least one embodiment, the relay node includes an indication of a scheduled status of the UE as regards the access link scheduling request. Including indications of the scheduling status for UEs that are already scheduled on the access link, or where such scheduling decisions are pending, provides the donor base station with important information to consider in its UL scheduling—e.g., it may reserve or otherwise plan for forthcoming UL transmissions from the schedule or to-be-scheduled UEs, as indicated in the relay node BSR.

Additionally, in one or more embodiments, the teachings herein provide a relay node configured to act as a relay between a user equipment (UE) and a base station of a wireless communication network, referred to as a donor base station. The relay node includes an access link communication interface configured for communicating with the UE and a backhaul communication interface for communicating with the donor base station.

Further, the relay node includes one or more processing circuits, including a scheduling controller, configured to receive an access link scheduling request from a UE having buffered uplink data to send to the relay node—ultimately, this data is to be sent to the donor base station. The access link scheduling request requests that the UE be scheduled by the relay node on the access link for transmission of the UE's buffered uplink data. The scheduling controller additionally is configured to trigger an early relay node BSR toward the donor base station; send a backhaul link scheduling request to the donor base station responsive to triggering the early relay node BSR; receive a backhaul link scheduling grant from the donor base station; and send the early relay node BSR to the donor base station responsive to said backhaul link scheduling grant.

In at least one embodiment, the relay node includes in a relay node BSR an indication of a scheduled status of one or more UEs supported by the relay node. As an example, the relay node is configured to include such indications for the case where the relay node has an empty uplink buffer when it triggers an early relay node BSR. Here, the relay node advantageously uses the early relay node BSR to indicate the scheduled status of any UEs connected to the relay node. Further, in at least one such embodiment, the relay node includes indications of the scheduled status of one or more UEs supported by the relay node in a relay node BSR that is normally triggered, rather than triggered early.

In yet another embodiment, the present invention provides a method at a donor base station in a wireless communication network. The method includes receiving a relay node Buffer Status Report (BSR) from a relay node that communicatively couples user equipments (UEs) to the donor base station, where the relay node and the donor base station communicate on a backhaul link and the relay node and the UEs communicate on an access link. The method further includes determining from the relay node BSR that the relay node has an empty uplink transmit data buffer but that the relay node has one or more uplink data transmissions pending from one or more of the UEs supported by the relay nodes, and incorporating the determination that the relay node has one or more uplink data transmissions pending into scheduling decisions made by a scheduling controller of the donor base station. Here, the scheduling controller determines scheduling of uplink resources on the backhaul link with the relay node and on a second access link with one or more additional UEs that are directly supported by the donor base station.

Correspondingly, the present invention also provides for a donor base station method that includes a scheduling controller configured to make scheduling decisions for scheduling uplink transmissions on a backhaul link for user equipments (UEs) indirectly supported by the donor base station via an associated relay node, and scheduling uplink transmissions on an access link for UEs directly supported by the donor base station. The example base station also includes an access link interface configured for sending downlink transmissions to UEs on the access link and receiving uplink transmissions from UEs on the access link, and a backhaul link interface configured for sending downlink transmissions to UEs on the backhaul link, via the relay node, and for receiving uplink transmissions from the UEs on the backhaul link, via the relay node.

As a particular aspect of the base station, the scheduling controller is configured to receive relay node Buffer Status Reports (BSRs), and to determine from any one of the BSRs that the relay node has an empty uplink transmit data buffer but that the relay node has one or more uplink data transmissions pending from one or more of the UEs supported by the relay nodes, and incorporate the determination that the relay node has one or more uplink data transmissions pending into the scheduling decisions. For example, when allocating resources as part of ongoing scheduling, the donor base station may allocate certain resources in advance, based on its knowledge of the scheduled or pending transmissions of UL data from UEs being supported by the relay node, although such data does not yet reside in the relay node buffer.

Of course, the present invention is not limited by the above brief summary of features and advantages. Those of ordinary skill in the art will recognize further features and advantages upon reading the following description, which provides further details for various example embodiments.

DETAILED DESCRIPTION

Figure 2:
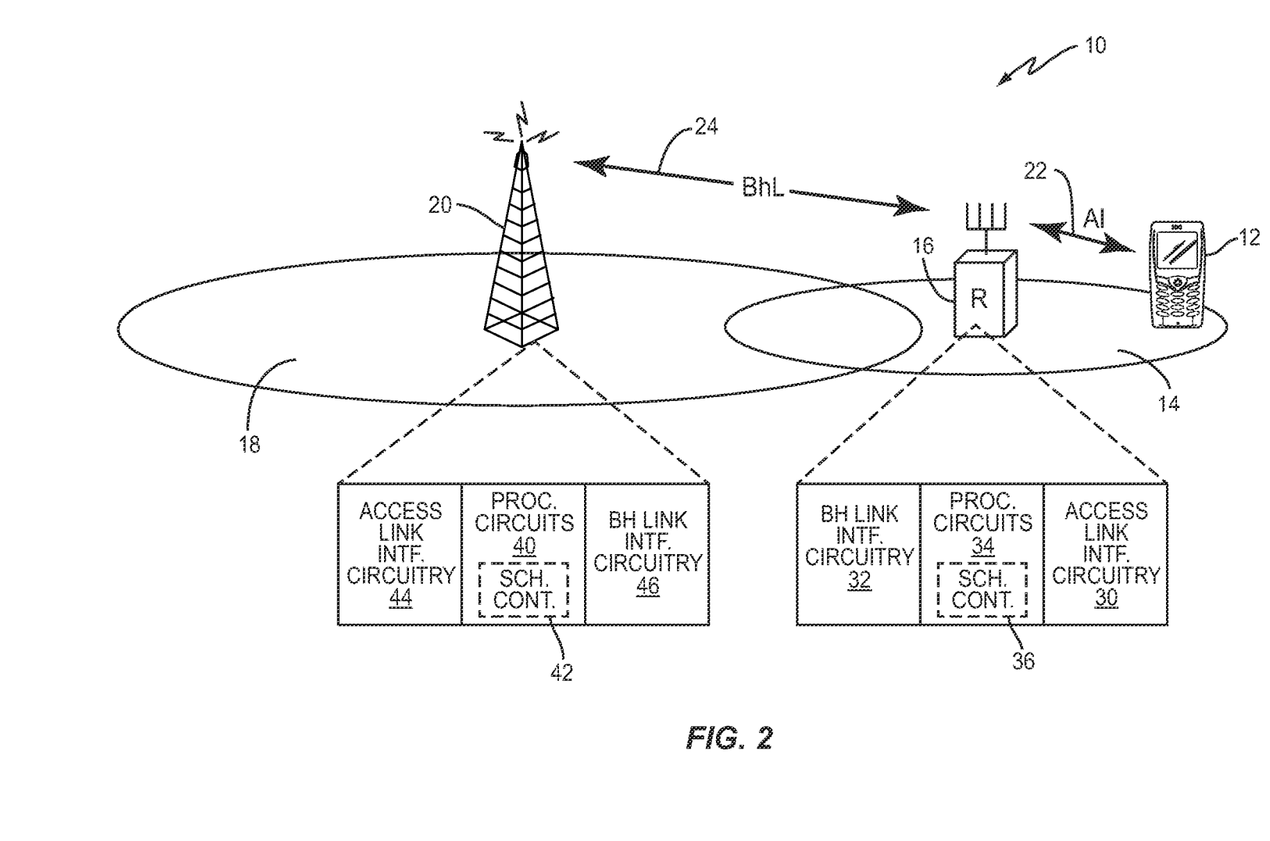
FIG. 2 is a block diagram of one embodiment of a wireless communication network that includes a base station operating as a donor base station for a relay node configured according to the teachings presented herein.

FIG. 2 illustrates an example wireless communication network 10 wherein a user equipment (UE) 12 is supported by a relay cell 14 that is provided by a relay node 16. The relay cell 14 overlaps with or is otherwise adjacent to a "donor" cell 18 that is provided by a donor base station 20 in the wireless communication network 10. Although only one UE 12 is illustrated for simplicity, multiple UEs 12 may be supported by the relay node 16 and multiple other UEs 12 may be supported directly by the donor base station 20.

Thus, according to the illustrated network 10, it will be understood that given UEs 12 communicate directly with the donor base station 20 via a one-hop radio link or communicate indirectly with the donor base station 20 via a two-hop radio link supported by the relay node 16, in dependence on where the given UEs 12 are positioned within the donor cell 18. As a non-limiting example, the relay cell 14 overlaps a cell-edge region of the donor cell 18, and thus provides for more robust (e.g., high-rate) service within the overlapped cell edge area, or otherwise extends the service area of the donor base station 20 via the extended coverage area of the relay cell 14.

Taking the LTE standard as an example network context, the UE 12 is a mobile terminal, wireless computer, network modem, or other wireless communication device that is configured for operation according to the LTE standards. Correspondingly, the relay node 16 operates according to the LTE standards and provides, for example, scheduled resources on an access link (AL) 22 between the relay node 16 and the UEs 12 supported by the relay node 16. For the LTE case, the AL 22 is designated the Uu link. Further, the relay node 16 and the donor base station 20 communicate on a backhaul link (BhL) 24, and the donor base station 20 schedules uplink transmissions on the BhL 24 by the relay node 16. For the LTE case, the BhL 24 is designated the Un link. Of course, the present invention is not limited to the LTE case, although its application to LTE is advantageous.

Thus, according to the example illustration, the relay node 16 is configured to act as a relay between the UE 12 and the donor base station 20, and one sees that it comprises a number of processing systems or subsystems to support such operation. In the illustrated example, the relay node 16 comprises an access link communication interface 30 configured for communicating with the UE 12 (and any other UEs 12 being supported by the relay node 16) and a backhaul communication interface 32 for communicating with the donor base station 20. These interfaces will be understood to include transceiver circuitry for wirelessly transmitting and receiving, along with the requisite circuitry and logical processing resources for transmit and receive signal processing. Such processing in one or more embodiments includes the implementation of signaling and control protocols, such as stack-based protocol processing, which may include Physical Layer processing, MAC Layer processing, RRC/RLC Layer processing, etc.

Of more particular interest with respect to this disclosure, the relay node 16 includes one or more processing circuits 34, including a scheduling controller 36. These processing circuits comprise dedicated or "fixed" circuitry, programmable circuitry, or some combination of both. For example, certain functional elements of the processing circuits 34 may be implemented in fixed hardware for efficiency or speed, while other functional elements are implemented by one or more microprocessors, DSPs, or other digital processing circuits, based on the execution of stored computer program instructions, which may be held in memory or another computer-readable medium included in the relay node 16.

In any case, the relay node 16 is advantageously configured to trigger "early" relay node buffer status reports (BSRs) towards the donor base station 20. Here, the triggering is early because it is done in advance of receiving any UL data from a UE 12 that has sent an access link scheduling request ("SR") to the relay node 16. That SR indicates that the UE 12 has uplink data to send to the relay node 16. Conventionally, the relay node would send an initial grant to the UE in response to receiving the UE's SR, and the UE would use that grant to send all or some of its buffered UL data. Specifically, if the initial grant is large enough, the UE would send all of the uplink data using the initial grant, without need for sending a BSR from the UE to the relay node. Conversely, if the initial grant was not large enough to send all of the UE's buffered data, the UE would send a BSR plus an amount of the buffered data that would fit into the initial grant. In either case, the conventional relay node would wait until at least some of the data was received, which includes the case where the relay node waits until at least the UE BSR is received.

It is contemplated here, however, that the relay node 16 is configured to trigger an early relay node BSR towards the donor base station 20, where that triggering is done in advance of receiving any of the UE's buffered uplink data. As such, the term "early" as used here will also be understood to indicate that the triggering is done in advance of receiving the UE's BSR, which, if sent at all by the UE 12, is sent as part of an initial uplink transmission by the UE 12, done in response to the UE 12 receiving an access link scheduling grant from the relay node 16. In this regard and for any given UE 12 that is supported by the relay node 16, it will be understood that the scheduling controller 36 and/or another processing entity within the processing circuits 34 are configured to receive an access link scheduling request from the UE 12.

The teachings herein consider early relay node BSR triggering in several contexts. For example, from time to time the relay node 16 will have no data buffered in its uplink transmit buffer for relaying to the donor base station 20. This is referred to as the relay node 16 having an "empty" uplink buffer and an example case of early relay node BSR triggering as taught herein assumes that the access link scheduling request (an "SR") from the UE 12 is received at such a time. In an equivalent or similar example case, the relay node 16 has only lower-priority data in its UL transmit buffer, where such data has not been scheduled for transmission by the donor base station 20.

The access link scheduling request from the UE 12 is interpreted by the relay node 16 as a request that the UE 12 be scheduled on the access link for transmission of uplink data to the relay node 16, for relay to the donor base station 20. The processing circuits 34 of the relay node 16 are advantageously configured to trigger an early relay node BSR toward the donor base station 20 before receiving any of the uplink data giving rise to the UE's transmission of the access link scheduling request. As such, the processing circuits 34 are configured to send a backhaul link scheduling request (SR) to the donor base station 20 responsive to triggering of the relay node BSR and correspondingly receive a backhaul link scheduling grant from the donor base station 20.

In at least one embodiment, the processing circuits 34 of the relay node 16 are configured to form or otherwise generate the early relay node BSR to include an indication of a scheduled status of the UE 12 as regards the access link scheduling request. Note that scheduled status indications may be included for multiple UEs 12. In a particular example of such a case, the relay node 16 is configured to include information regarding the scheduled status of one or more of the UEs 12 supported by the relay node 16 in the case where the early relay node BSR is generated at a time when the relay node 16 has an empty UL transmit buffer.

Figure 3:
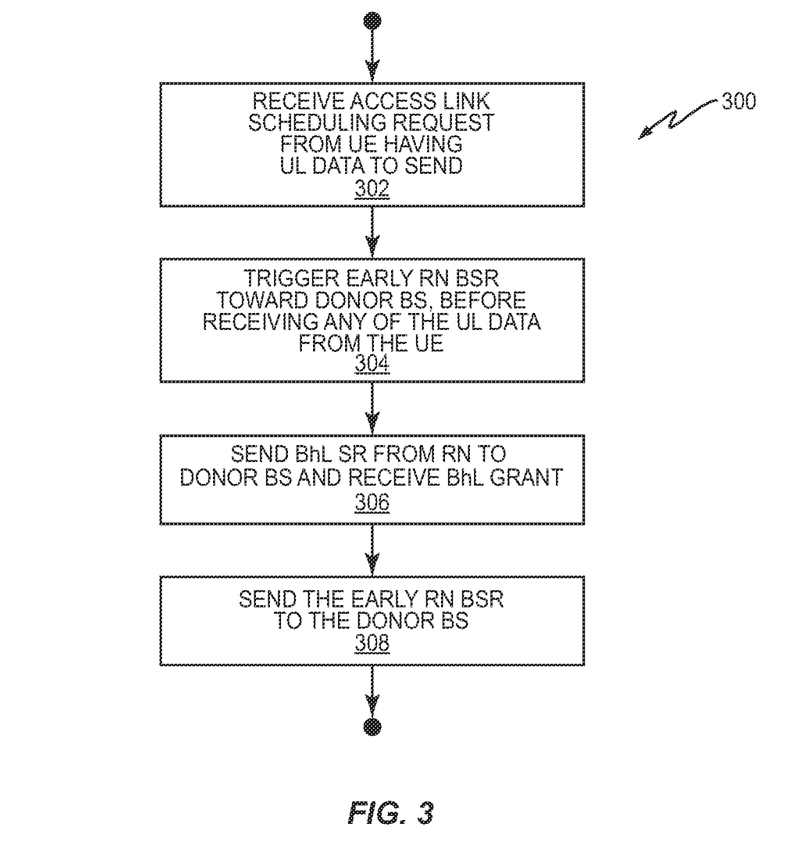
FIG. 3 is a logic flow diagram of one embodiment of a method of early BSR triggering at a relay node, according to the teachings presented herein, for reducing multi-hop latency in the UL.

FIG. 3 illustrates an example embodiment of processing implemented by appropriately configured processing circuitry in the relay node 16, which implements the above-described method. In particular, FIG. 3 illustrates a method 300 implemented in the relay node 16. It will be understood that the illustrated method 300 is not necessarily limited to the disclosed order of processing steps, and it will be understood that such processing may be done on an ongoing basis, as part of regular relay node operational and control processing According to the method 300, the relay node 16 receives an access link scheduling request from a given UE 12, which indicates that the UE 12 has uplink data to send to the relay node 16 (Block 302). Further according to the method 300, the relay node 16 triggers an early BSR before receiving any of that uplink data from the UE 12 (Block 304). In response to the early relay node BSR triggering, the relay node 16 sends a backhaul link scheduling request to the donor base station 20 and receives a corresponding backhaul link scheduling grant (Block 306).

The relay node 16 uses that grant from the donor base station 20 to send the early relay node BSR to the donor base station 20 (Block 308). As noted, in at least one embodiment disclosed herein, the early relay node BSR includes an indication of the scheduled status of the UE 12. That indication advantageously apprises the donor base station 20 that an UL data transmission by the UE 12 has been (or will be) scheduled by the relay node 16. In an alternative contemplated herein, the relay node 16 triggers an early relay node BSR and sends a scheduling request to the donor base station 20. It is assumed in this alternative that the relay node 16 has received at least some uplink data from the UE 12 when the relay node 16 receives the backhaul grant from the donor base station 20. In this case, the relay node 16 includes uplink data from the UE 12 in its relay node BSR, along with scheduling information for the UE 12.

In any case, as will be later detailed, the donor base station 20 may be configured to incorporate the scheduling information it receives in relay node BSRs into its own operations—e.g., make informed scheduling decisions or other resource reservation decisions in view of the scheduling information from the relay node 16.

Figure 4:
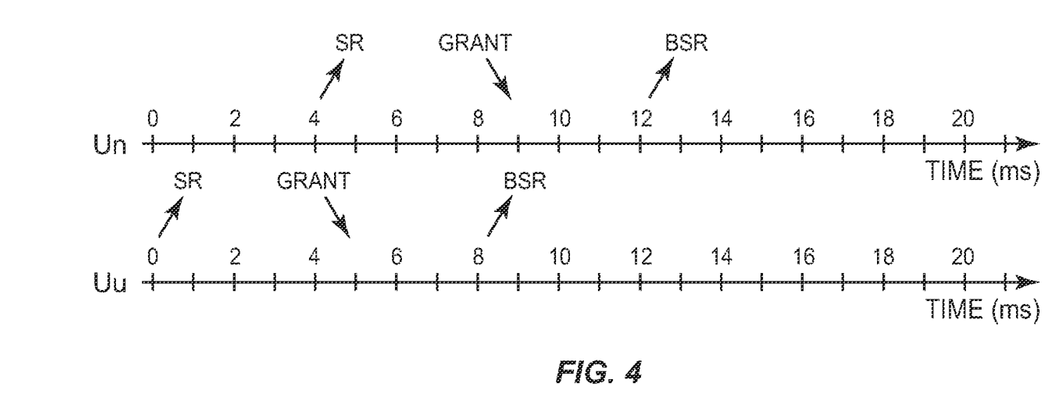
FIG. 4 is a timing diagram of Uu and Un scheduling requests and scheduling grants, according to teachings presented herein.

FIG. 4 provides an example timing diagram for a relay node 16 carrying out the method 300 of FIG. 3. It will be understood that the illustrated timing provides a meaningful example, but is not meant to be limiting. It will also be understood that the timing is relative—i.e., "time 0" in the diagram simply denotes a reference point for the illustrated signaling.

Accordingly, a UE 12 sends an SR on the Uu link to the relay node 16 at time 0. The UE 12 sends the SR because it has new UL data to send. The relay node 16 responds to the UE's SR by sending an SR on the Un link to the donor base station 20 and sending an initial grant on the Uu to the UE 12. The early triggering of the relay node BSR at the relay node 16 may be understood as being carried out in conjunction with or as part of sending the SR to the donor base station 20.

Thus, the illustrated timing shows the SR sent from the relay node 16 to the donor base station 20 and the grant sent from the relay node 16 to the UE 12 as occurring at about the same time (the 4 ms mark). It will be understood that such timing can be varied, and that the relay node 16 generally will make a scheduling decision for the UE 12 sometime between receiving the SR from the UE 12 and sending the initial grant to the UE 12. The initial grant from the relay node 16 to the UE 12 reflects the relay node's scheduling decision.

At around the 8 ms mark, the relay node 16 receives an initial grant from the donor base station 20 (responsive to the SR sent from the relay node 16). At around the same time, the relay node 16 receives UL data, which may include a UE BSR from the UE 12. With such data received in advance of the relay node's transmission of its early relay node BSR to the donor base station 20, at least a portion of the UL data from the UE is included or otherwise indicated in the relay node's early BSR. However, there are many cases where the UL data from the UE 12 is not is not timely received by the relay node 16, for inclusion in the early relay node BSR—keeping in mind that the early relay node BSR is denoted as being "early" because it is triggered by the relay node 16 in advance of receiving any of the uplink data from the UE 12.

Figure 5:
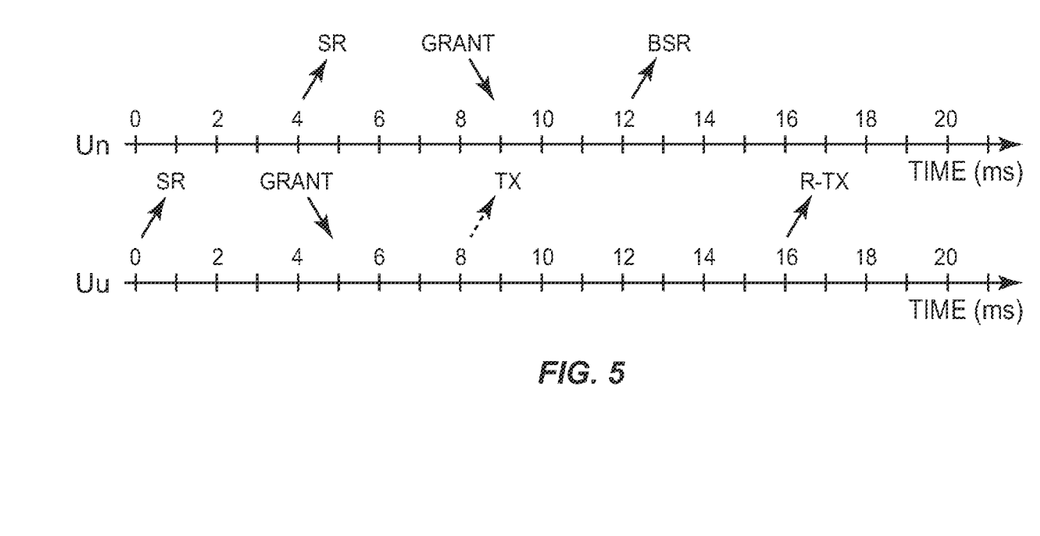
FIG. 5 is a timing diagram of Uu and Un scheduling requests and scheduling grants, according to teachings presented herein.

FIG. 5 illustrates a case where UL data from the UE 12 is not received in time for inclusion in the early relay node BSR. It will be understood that one or more embodiments of the present invention advantageously address such a case. The Uu and Un signaling illustrated in FIG. 5 generally corresponds to that shown in FIG. 4 except that the UE's UL transmission at time 8 fails—i.e., the UE 12 transmits its UL data and/or UE BSR to the relay node 16, but that transmission is not successfully received by the relay node 16. Rather than wait for retransmission from the UE 12 to the relay node 16—the timing of which will depend on the network standards/protocols in use—the relay node 16 sends its early relay node BSR to the donor base station 20 in advance of receiving the UL data and/or BSR from the UE 12. In this case, the relay node BSR would indicate empty buffer. (Another scenario where the relay node buffers might be empty is in the case where the initial grant from the relay node 16 to the UE 12 on the access link was only big enough to hold the UE BSR but no payload data. In that case, even if the relay node 16 receives the UE BSR before it sends the early relay node BSR, its UL transmit buffer may still be empty of UL data.)

Figure 6:
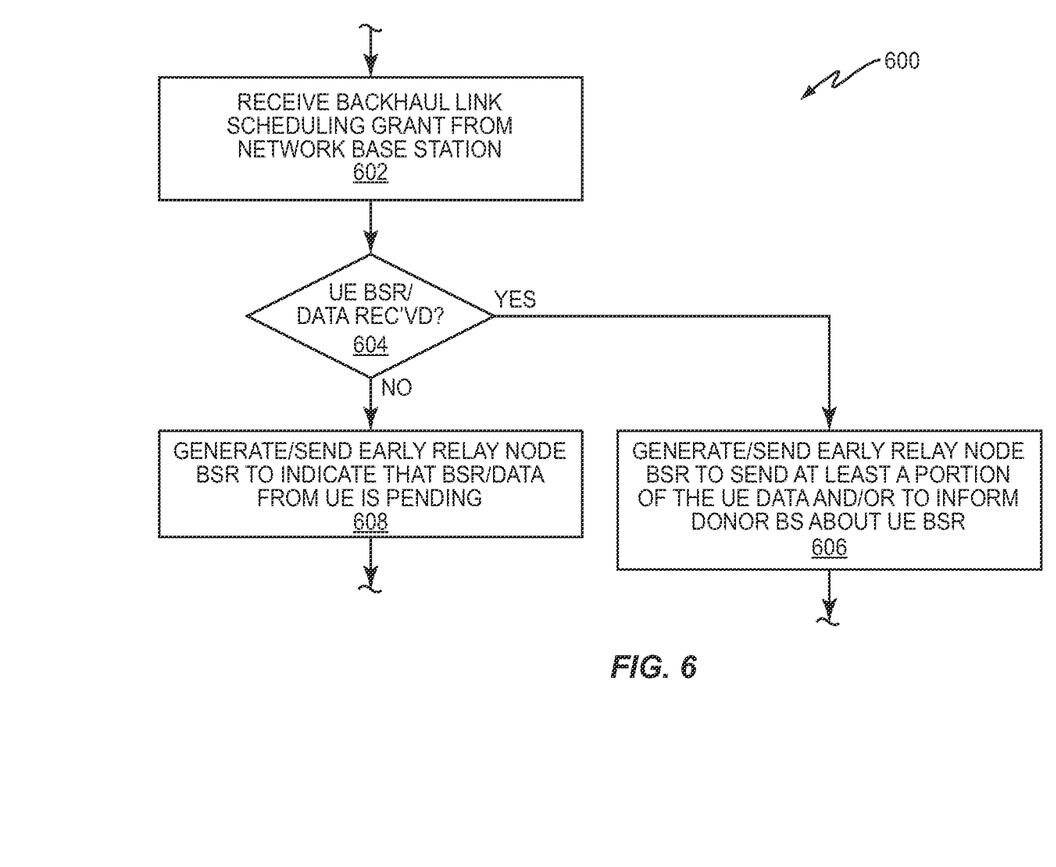
FIG. 6 is a logic flow diagram of one embodiment of processing at a relay node, for the two (timing) cases presented in FIGS. 4 and 5.

FIG. 6 illustrates one example of decision-based processing at the relay node 16 for the two cases illustrated by FIGS. 4 and 5. The method 600 of FIG. 6 begins with the assumption that an SR was received at the relay node 16 from a UE 12 and that the relay node 16 has already sent a corresponding SR to the donor base station 20. Thus, the illustrated method 600 begins with the relay node 16 receiving a backhaul link scheduling grant from the donor base station 20, in response to the relay node's earlier-sent SR (Block 602).

The method 600 continues with the relay node 16 determining whether it has or has not received the scheduled transmission from the UE 12 (Block 604). Here, it will be understood that the "scheduled transmission" from the UE is the transmission performed by the UE 12 in response to the scheduling grant sent by the relay node 16, where that scheduling grant is sent in response to the scheduling request first sent from the UE 12.

If the relay node 16 has received the UL data from the UE and/or the UE BSR (Yes from Block 604), processing continues with the relay node 16 sending an early relay node BSR that includes all or part of the UL data from the UE 12 (Block 606). Conversely, if the relay node 16 has not received the UL data or UE BSR (No from Block 604), processing continues with the relay node 16 sending the early relay node BSR with an indication that the BSR/data is pending from the UE 12 (Block 608). More particularly, in one or more embodiments, the relay node BSR includes an indication of the scheduled status of the UE 12. Note that this inclusion of scheduled status information in the early relay node BSR can be limited to the case where the relay node has no uplink data to send when it generates/sends the early relay node BSR.

As another point to consider regarding timing, it was noted for FIG. 3 that certain processing steps may be performed in varying orders. For example, in one embodiment, the scheduling controller 36 is configured to trigger the early relay node BSR before scheduling the UE 12. In another embodiment, it is configured to trigger the early relay node BSR after scheduling the UE 12 but before sending the access link scheduling grant. In yet another embodiment, it is configured to trigger the early relay node BSR after scheduling the UE 12 and after sending the access link scheduling grant, but before receiving the scheduled uplink transmission from the UE 12. These embodiments may be combined, such that the scheduling controller 36 selects one of the above-three timings for triggering the early relay node BSR depending upon, for example, a configured setting (which may be set by the donor base station 20, for example). It should also be understood that "triggering" a BSR at the relay node 16 initiates a series of related operations or processing steps, including the relay node 16 sending an SR to the donor base station 20, and the relay node 16 actually generating or forming the early relay node BSR responsive to the trigger, for transmission to the donor base station 20.

In at least one embodiment, the scheduling controller 36 is configured to indicate the scheduled status of the UE 12 in the early relay node BSR by including information in the early relay node BSR that indicates one of: that an uplink transmission has been scheduled but not granted in response to the access link scheduling request; or that an uplink transmission has been scheduled and granted in response to the access link scheduling request; or that a scheduling decision is pending for the access link scheduling request.

In at least one such embodiment, if the relay has an empty uplink transmit buffer, the scheduling controller 36 is configured to indicate the scheduled status of the UE 12 in the relay node BSR by setting bits comprising a Logical Channel Group ID to a pattern that indicates whether the relay node 16 has granted uplink resources to the UE 12 (or any UE 12 being supported by the relay node 16) on the access link.

In the LTE case in particular, the scheduling controller 36 is configured to generate the early relay node BSR as a short-format BSR in the case that the relay node 16 has an empty uplink transmit buffer for all Logical Channel Groups (LCGs). In other words, in the case that the UL data buffer at the relay node 16 is empty, the buffer status field of the early relay node BSR is set to indicate zero bits, but the LCG ID fields are used to inform the donor base station 20 regarding the scheduling status of one or more UEs 12.

In a particular embodiment, the scheduling controller 36 is configured to generate the early relay node BSR according to any one or more of the following rules: set a two-bit LCG value to "00" to indicate that the relay node 16 has no uplink transmit data in its buffer for any LCG, that no uplink data is scheduled or granted for access link, and that there are no un-granted scheduling requests for uplink transmissions on the access link; set the two-bit LCG value to "01" to indicate that the relay node 16 has no uplink transmit data in its buffer for any LCG, and that one or more scheduling requests have been received for uplink transmissions on the access link but that the relay node 16 has not made any corresponding scheduling decisions or grants; set the two-bit LCG value to "10" to indicate that the relay node 16 has no uplink transmit data in its buffer for any LCG and that under "x" bits have been granted or scheduled by the relay node 16 on the access link, where x is a defined integer value; and set the two-bit LCG value to "11" to indicate that the relay node 16 has no uplink transmit data in its buffer for any LCG, and that over x bits have been granted or scheduled.

In another related embodiment, the scheduling controller 36 is configured to generate the early relay node BSR according to any one or more of the following rules: set a two-bit LCG value to "10" to indicate that the relay node 16 has no uplink transmit data in its buffer for any LCG and that some uplink transmit data bits have been scheduled or granted on the access link by the relay node 16, to arrive within "y" ms, where y is a defined integer number; and set a two-bit LCG value to "11" to indicate that the relay node 16 has no uplink transmit data in its buffer for any LCG and that some uplink transmit bits have been scheduled or granted on the access link by the relay node 16, to arrive after y ms.

Returning to FIG. 2, an example implementation of the donor base station 20 includes one or more processing circuits 40, including a scheduling controller 42 that is configured to make scheduling decisions for scheduling uplink transmissions on a backhaul link for user equipments (UEs) 12 indirectly supported by the donor base station 20 via an associated relay node 16, and scheduling uplink transmissions on an access link for UEs 12 directly supported by the donor base station 20. Correspondingly, the donor base station 20 further includes an access link interface 44 configured for sending downlink transmissions to UEs 12 on the access link and receiving uplink transmissions from UEs 12 on the access link, and a backhaul link interface 46 configured for sending downlink transmissions to UEs 12 on the backhaul link, via the relay node 16, and for receiving uplink transmissions from the UEs 12 on the backhaul link, via the relay node 16. It will be understood that any given UE 12 supported by the donor base station 20 generally will be supported either directly by the base station 20 or indirectly via the relay node 16.

According to this arrangement, the scheduling controller 42 is configured to receive "early" relay node BSRs as defined herein, and to determine from any one of the early relay node BSRs that the relay node 16 has an empty uplink transmit data buffer but that the relay node 16 has one or more uplink data transmissions pending from one or more of the UEs 12 supported by the relay node 16. Further, the scheduling controller 42 is configured to incorporate the determination that the relay node 16 has one or more uplink data transmissions pending into the scheduling decisions it is making. For example, the decision can be that the donor base station 20 pre-schedules the relay node 16 until some UL data is received from the relay node 16. That is, based on the UE scheduling information indicated by the relay node 16 to the donor base station 20 via the early relay node BS, the donor base station 20 may go ahead and schedule resources for an uplink transmission from the relay node 16, even though the early relay node BSR indicated that the relay node 16 had an empty UL transmit buffer.

As with the relay node 16, it will be understood that the functional systems/sub-systems comprising the donor base station 20 may be implemented using fixed circuitry and/or programmable circuitry. In one or more embodiments, at least a portion of the processing circuits 40 in the donor base station 20, such as the scheduling controller 42 and one or more other logical processing circuits, are implemented using microprocessors, DSPs, or other digital processing circuitry that is configured at least in part based on the execution of stored computer program instructions.

Figure 7:
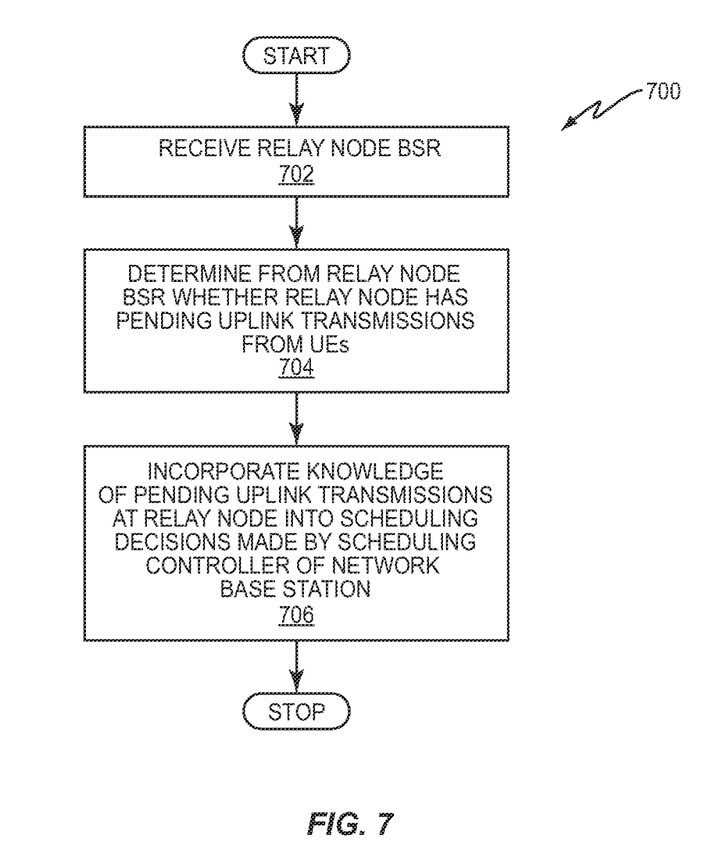
FIG. 7 is a logic flow diagram of one embodiment of processing at a donor base station according to teachings presented herein.

Regardless of its implementation particulars, however, it will be understood that one or more embodiments of the present invention provide a donor base station 20 that is configured to implement, for example, the method 700 illustrated in FIG. 7. The method 700 includes receiving a relay node BSR from a relay node 16 (Block 702), e.g., receiving a relay node BSR that includes scheduled status indicators for one or more UEs 12 being supported by the relay node 16.

The method 700 thus includes determining from the relay node BSR whether the relay node 16 has pending uplink transmissions from any of the UEs 12 being supported by it (Block 704). Here, a "pending" uplink transmission is recognized from an indication that any given UE/UEs 12 has/have been or will be scheduled for an UL data transmission. To the extent that the relay node BSR includes one or more such indications, the donor base station 20 incorporates knowledge of those pending UE transmissions into its (ongoing) scheduling decisions—e.g., it may reserve resources for one or more future scheduling intervals, to allow for the relay node 16 to relay such data to the donor base station 20 (Block 706).

With the above in mind, it will be understood that the present invention provides methods and apparatuses for reducing UL latency in multi-hop relay-based systems, as compared to conventional approaches for buffer status reporting. While not a limiting application, the teachings herein are especially useful when transmitting a TCP acknowledgement consisting of some hundreds of bits that can fit into an initial grant. The delay reduction provided by the teachings herein for such acknowledgments substantially decreases the TCP slow start impact on the bit rate and thus can significantly decrease the download time of a file. According to the TCP slow start mechanism, the TCP sender probes the bandwidth of the link and limits the sending rate. If the delays are shorter, the slow start phase is shorter and its impact is therefore smaller.

A significant aspect of such operation relies on the above-described early triggering of the relay node BSR, where the relay node 16 triggers the relay node BSR early, in anticipation of but before actually receiving UL data from a UE 12 that has requested UL resources on the Uu interface by sending an access link scheduling request to the relay node 16 on the Uu link. As noted, early triggering of the BSR at the relay node 16 may be performed in the case that the uplink transmit buffer of the relay node 16 is empty and/or when the relay node 16 only has data in its buffers of priority <Z, where Z is fixed or configurable. In this regard, it is assumed that UL data that will be incoming from the UE 12 has priority Z or greater. It will be understood then that the "early" designation as used in the phrase "early relay node BSR" is not meant to indicate a specific time for receipt at the donor base station 20, but rather to indicate that the relay node BSR at issue is triggered earlier than it would have been according to the previously known approaches.

As for the structure and contents of the relay node BSR, it should be understood that in LTE Rel-8/Rel-9 if a UE has an uplink transmission grant which is greater than its buffer size, the UE transmits a padding BSR. The Padding BSR can be either a Short or Long BSR. In the Short BSR, the Logical Channel Group (LCG) ID is stated as well as the corresponding buffer size. If the buffer is empty for all logical channel groups, the buffer size field indicates zero bits and the reported LCG ID is arbitrary. In LTE, there are four logical channel groups. Thus, the empty buffer can be reported in four different ways.

In one embodiment taught herein, the logical channel group field having 2 bits in the Short BSR is utilized to inform the donor base station 20 whether the relay node 16 has scheduled one or more UEs in the Uu link. According to at least one LTE-related embodiment of the present invention, it is proposed to change the LTE Rel-8/Rel-9 BSR triggering rules as follows.

When the relay node 16 has an empty buffer for all LCGs, it always reports a Short BSR. The bits in the LCG ID field reported by a relay node 16, when combined with a zero in the buffer size field, can have the following meaning: value 00 indicates no data in the relay buffer for any LCG, no data scheduled or granted for Uu UL and no un-granted SR on the Uu; value 01 indicates no data in the relay buffer for any LCG and that an SR has been received on the Uu but no corresponding scheduling decision or granting has been performed by the relay node 20; value 10 indicates no data in the relay buffer for any LCG and under "X" bits have granted or scheduled on the Uu; value 11 indicates no data in the relay buffer for any LCG and over X bits have been granted or scheduled on the Uu.

Alternatively, the meaning for values 10 and 11 could be: value 10 indicates no data in the relay buffer for any LCG and that some bits have been scheduled or granted on the Uu, to arrive within "Y" ms; and value 11 indicates no data in the relay buffer for any LCG and that some bits have been scheduled or granted on the Uu, to arrive after Y ms.

Of course, it is contemplated herein to use various combinations of the bit and time thresholds described above. Further, the values for X and Y can be fixed or configured by higher layer signaling, for example. As a further advantage, usage of bits in the LCG ID field to carry the additional meanings contemplated herein will be "transparent" to an eNB that is not configured to make use of the present invention.

Of course, the present invention is not limited by the foregoing discussion of example embodiments, or by the accompanying drawings. Modifications and other embodiments are intended to be included within the scope of this disclosure. It also should be noted that although specific terms may be employed herein, they are used in a generic and descriptive sense only and not for purposes of limitation.

What is claimed is:

1. A method of uplink scheduling at a relay node that communicatively couples a user equipment (UE) to a donor base station in a wireless communication network, wherein the relay node and the UE communicate over an access link and the relay node and the donor base station communicate over a backhaul link, and wherein the method comprises:

receiving an access link scheduling request from a UE having uplink data to transmit to the relay node;

triggering an early relay node Buffer Status Report (BSR) toward the donor base station before receiving any of the uplink data;

sending a backhaul link scheduling request to the donor base station responsive to said triggering of said early relay node BSR and correspondingly receiving a backhaul link scheduling grant from the donor base station; and sending the early relay node BSR to the donor base station responsive to said backhaul link scheduling grant.

2. The method of claim 1, wherein said triggering of the early relay node BSR comprises one of:
triggering the early relay node BSR before scheduling the UE responsive to the access link scheduling request;
triggering the early relay node BSR after scheduling the UE but before sending a corresponding access link scheduling grant to the UE; or
triggering the early relay node BSR after scheduling the UE and after sending the corresponding access link scheduling grant to the UE, but before receiving a corresponding scheduled uplink transmission from the UE.

3. The method of claim 1, wherein the method further comprises including in the early relay node BSR an indication of the scheduled status of the UE.

4. The method of claim 3, wherein including in the early relay node BSR the indication of the scheduled status of the UE comprises including information in the early relay node BSR that indicates one of: that an uplink transmission by the UE has been scheduled by the relay node but not yet granted in response to the access link scheduling request; or that an uplink transmission by the UE has been scheduled by the relay node and granted in response to the access link scheduling request; or that a scheduling decision by the relay node is pending for the access link scheduling request.

5. The method of claim 3, wherein including in the early relay node BSR the indication of the scheduled status of the UE comprises setting one or more bit indicators in the early relay node BSR to indicate that the UE has been or will be granted uplink resources on the access link.

6. The method of claim 5, wherein setting the one or more bit indicators comprises setting bits comprising a Logical Channel Group ID to a pattern that indicates whether the relay node has granted or will grant uplink resources to any UE on the access link.

7. The method of claim 3, wherein including in the early relay node BSR the indication of the scheduled status of the UE is performed conditionally in dependence on whether an uplink transmit buffer of the relay node is empty when the early relay node BSR is generated the relay node.

8. The method of claim 1, wherein the relay node comprises an LTE relay node and wherein the method further comprises generating the early relay node BSR as a short-format BSR in the case that the relay node has an empty uplink transmit buffer for all Logical Channel Groups (LCGs).

9. The method of claim 8, further comprising generating the early relay node BSR according to any one or more of the following rules:
setting a two-bit LCG value to "00" to indicate that the relay node has no uplink transmit data in its buffer for any LCG, that no uplink data is scheduled or granted for the access link, and that there are no un-granted scheduling requests for uplink transmissions on the access link;
setting the two-bit LCG value to "01" to indicate that the relay node has no uplink transmit data in its buffer for any LCG, and that one or more scheduling requests have been received for uplink transmissions on the access link but that the relay node has not made any corresponding scheduling decisions or grants;
setting the two-bit LCG value to "10" to indicate that the relay node has no uplink transmit data in its buffer for any LCG and that under "x" bits have been granted or scheduled by the relay node on the access link, where x is a defined integer value; and
setting the two-bit LCG value to "11" to indicate that the relay node has no uplink transmit data in its buffer for any LCG, and that over x bits have been granted or scheduled.

10. The method of claim 8, further comprising generating the early relay node BSR according to any one or more of the following rules:
setting a two-bit LCG value to "10" to indicate that the relay node has no uplink transmit data in its buffer for any LCG and that some uplink transmit data bits have been scheduled or granted on the access link by the relay node, to arrive within "y" ms, where y is a defined integer number;
setting a two-bit LCG value to "11" to indicate that the relay node has no uplink transmit data in its buffer for any LCG and that some uplink transmit bits have been scheduled or granted on the access link by the relay node, to arrive after y ms.

11. A relay node configured to act as a relay between a user equipment (UE) and a donor base station of a wireless communication network, said relay node comprising:
an access link communication interface configured for communicating with the UE and a backhaul communication interface for communicating with the donor base station; and
one or more processing circuits, including a scheduling controller, configured to:
receive an access link scheduling request from a UE having uplink data to send to the relay node;
trigger an early relay node Buffer Status Report (BSR) toward the donor base station before receiving any of the uplink data;
send a backhaul link scheduling request to the donor base station responsive to triggering said early node BSR and correspondingly receive a backhaul link scheduling grant from the donor base station; and
send the early relay node BSR to the donor base station responsive to said backhaul link scheduling grant.

12. The relay node of claim 11, wherein said scheduling controller is configured to trigger the early relay node BSR before scheduling the UE responsive to the access link scheduling request, or trigger the early relay node BSR after scheduling the UE but before sending a corresponding access link scheduling grant to the UE, or trigger the early relay node BSR after scheduling the UE and after sending the access link scheduling grant to the UE, but before receiving a corresponding scheduled uplink transmission from the UE.

13. The relay node of claim 11, wherein said scheduling controller is configured to include in the early relay node BSR an indication of the scheduled status of the UE.

14. The relay node of claim 13, wherein the scheduling controller is configured to include said indication of the scheduled status of the UE in the early relay node BSR by including information in the early relay node BSR that indicates one of:
that an uplink transmission by the UE has been scheduled by the relay node but not yet granted in response to the access link scheduling request; or
that an uplink transmission by the UE has been scheduled by the relay node and granted in response to the access link scheduling request; or
that a scheduling decision by the relay node is pending for the access link scheduling request.

15. The relay node of claim 13, wherein the scheduling controller is configured to include in the early relay node BSR the indication of the scheduled status of the UE by being configured to set one or more bit indicators in the early relay node BSR, to indicate that the UE has been or will be granted uplink resources on the access link.

16. The relay node of the claim 15, wherein the scheduling controller is configured to set the one or more bit indicators in the early relay node BSR by being configured to set bits comprising a Logical Channel Group ID to a pattern that indicates whether the relay node has granted uplink resources to any UE on the access link.

17. The relay node of claim 13, wherein the scheduling controller is configured to include in the early relay node BSR the indication of the scheduled status of the UE on a conditional basis, in dependence on whether an uplink transmit buffer of the relay node is empty when the early relay node BSR is generated.

18. The relay node of claim 11, wherein the relay node comprises an LTE relay node and wherein the scheduling controller is configured to generate the early relay node BSR as a short-format BSR in the case that the relay node has an empty uplink transmit buffer for all Logical Channel Groups (LCGs).

19. The relay node of claim 18, wherein the scheduling controller is further configured to generate the early relay node BSR according to any one or more of the following rules:
set a two-bit LCG value to "00" to indicate that the relay node has no uplink transmit data in its buffer for any LCG, that no uplink data is scheduled or granted for access link, and that there are no un-granted scheduling requests for uplink transmissions on the access link;
set the two-bit LCG value to "01" to indicate that the relay node has no uplink transmit data in its buffer for any LCG, and that one or more scheduling requests have been received for uplink transmissions on the access link but that the relay node has not made any corresponding scheduling decisions or grants;
set the two-bit LCG value to "10" to indicate that the relay node has no uplink transmit data in its buffer for any LCG and that under "x" bits have been granted or scheduled by the relay node on the access link, where x is a defined integer value; and
set the two-bit LCG value to "11" to indicate that the relay node has no uplink transmit data in its buffer for any LCG, and that over x bits have been granted or scheduled.

20. The relay node of claim 18, wherein the scheduling controller is further configured to generate the early relay node BSR according to any one or more of the following rules:
set a two-bit LCG value to "10" to indicate that the relay node has no uplink transmit data in its buffer for any LCG and that some uplink transmit data bits have been scheduled or granted on the access link by the relay node, to arrive within "y" ms, where y is a defined integer number; and
set a two-bit LCG value to "11" to indicate that the relay node has no uplink transmit data in its buffer for any LCG and that some uplink transmit bits have been scheduled or granted on the access link by the relay node, to arrive after y ms.

21. A method at a donor base station in a wireless communication network, said method comprising:
receiving a relay node Buffer Status Report (BSR) from a relay node that communicatively couples user equipments (UEs) to the donor base station, wherein the relay node and the donor base station communicate on a backhaul link and the relay node and the UEs communicate on an access link;
determining from the relay node BSR that the relay node has an empty uplink transmit data buffer but has one or more uplink data transmissions pending from one or more of the UEs supported by the relay node; and
incorporating the determination that the relay node has one or more uplink data transmissions pending into scheduling decisions made by a scheduling controller of the donor base station, wherein said scheduling controller determines scheduling of uplink resources on the backhaul link with the relay node and on a second access link with one or more additional UEs that are directly supported by the donor base station.

22. A base station configured for use as a donor base station with respect to a relay node in a wireless communication network, said donor base station comprising:
a scheduling controller configured to make scheduling decisions for scheduling uplink transmissions on a backhaul link for user equipments (UEs) indirectly supported by the donor base station via an associated relay node, and scheduling uplink transmissions on an access link for UEs directly supported by the donor base station;
an access link interface configured for sending downlink transmissions to UEs on the access link and receiving uplink transmissions from UEs on the access link;
a backhaul link interface configured for sending downlink transmissions to UEs on the backhaul link, via the relay node, and for receiving uplink transmissions from the UEs on the backhaul link, via the relay node; and
wherein said scheduling controller is configured to receive relay node Buffer Status Reports (BSRs), and to determine from any one of the BSRs that the relay node has an empty uplink transmit data buffer but that the relay node has one or more uplink data transmissions pending from one or more of the UEs supported by the relay nodes, and incorporate the determination that the relay node has one or more uplink data transmissions pending into the scheduling decisions.

* * * * *

UNITED STATES PATENT AND TRADEMARK OFFICE
CERTIFICATE OF CORRECTION

Page 1 of 1

PATENT NO.         : 8,543,054 B2
APPLICATION NO.    : 12/980191
DATED              : September 24, 2013
INVENTOR(S)        : Östergaard et al.

It is certified that error appears in the above-identified patent and that said Letters Patent is hereby corrected as shown below:

In the Specification

In Column 12, Line 28, delete "node 20;" and insert -- node 16; --, therefor.

In the Claims

In Column 15, Line 7, in Claim 16, delete "of the claim" and insert -- of claim --, therefor.

Signed and Sealed this
Fourth Day of March, 2014

Michelle K. Lee
*Deputy Director of the United States Patent and Trademark Office*